United States Patent [19]

Okamoto

[11] Patent Number: 5,898,427
[45] Date of Patent: Apr. 27, 1999

[54] PEN, USED FOR INPUT TO ELECTRONIC APPARATUS, INCLUDING A WEIGHTED MEMBER DISPOSED IN THE PEN TO CREATE A RADIALLY ECCENTRIC CENTER OF GRAVITY WITHIN THE PEN

[75] Inventor: Kazuhiko Okamoto, Nara, Japan

[73] Assignee: Sharp Kabushiki Kaisha, Osaka, Japan

[21] Appl. No.: 08/405,777

[22] Filed: Mar. 17, 1995

[30] Foreign Application Priority Data

Mar. 18, 1994 [JP] Japan ................. 6-048687

[51] Int. Cl.$^6$ ............... G09G 5/00; G08C 21/00
[52] U.S. Cl. ............... 345/179; D19/35; 178/18; 250/227.13; 401/131
[58] Field of Search ............... 345/179, 180, 345/181, 182, 183; 178/18; D19/35; 250/227.13; 401/131

[56] References Cited

U.S. PATENT DOCUMENTS

| D. 355,932 | 2/1995 | Beffa | D19/36 |
|---|---|---|---|
| 1,038,738 | 9/1912 | Fouquier | 401/131 |
| 1,122,909 | 12/1914 | Graff | 401/131 |
| 2,508,075 | 5/1950 | Morris | 401/131 |
| 4,169,334 | 10/1979 | Breslow | 46/103 |
| 4,377,349 | 3/1983 | Kunii | 401/115 |
| 4,902,858 | 2/1990 | Yamanami et al. | 178/19 |
| 5,067,573 | 11/1991 | Uchida | 178/18 |
| 5,179,502 | 1/1993 | Matsuda | 361/392 |
| 5,180,891 | 1/1993 | Trumbo | 178/18 |
| 5,401,917 | 3/1995 | Yoshida et al. | 178/18 |
| 5,454,654 | 10/1995 | Bergström | 401/99 |
| 5,483,262 | 1/1996 | Izutani | 345/179 |
| 5,530,208 | 6/1996 | Moriconi et al. | 178/18 |

FOREIGN PATENT DOCUMENTS 2-94189   7/1990   Japan ................. B43K 29/00

Primary Examiner—Wendy Garber
Assistant Examiner—Ngoc-yen Vu

[57] ABSTRACT

A pen for providing input to an electronic apparatus includes a cylindrical pen body made of a resin, a pen tip attached to one end of the pen body, and a weight member disposed within the pen body and offset from the axis of the pen body. The weight member is of a density higher than that of the rein. This allows the center of gravity of the pen body to be radially eccentric with respect to the axis thereof and aids in preventing rolling of the pen.

16 Claims, 7 Drawing Sheets

PEN, USED FOR INPUT TO ELECTRONIC APPARATUS, INCLUDING A WEIGHTED MEMBER DISPOSED IN THE PEN TO CREATE A RADIALLY ECCENTRIC CENTER OF GRAVITY WITHIN THE PEN

BACKGROUND OF THE INVENTION

1. Field of the Invention

The present invention relates to a pen for input operation and, more particularly, to a pen for input operation to be used for electronic apparatuses such as electronic diaries, handy information tools, word processors, personal computers and the like which have hand-writing and/or touchkey input functions.

2. Description of Related Art

Conventionally, pens for inputting to electronic apparatuses having hand-writing and/or touch-key input functions are provided with a clip portion or the like projecting outwardly from the cylindrical main body thereof in order to prevent rolling.

The projecting clip that prevents rolling makes such a conventional pen inconvenient, however, because the projecting clip makes contact with a finger of a user, giving an uncomfortable feeling to the user.

Further, the pen with the projecting clip occupies a significant amount of space for accommodation in an electronic apparatus, and cannot easily be taken out of or put back into a predetermined accommodation space due to a certain directional requirement for accommodating the pen in the space.

Japanese Unexamined Utility Model Publication No.2-94189 (1990), which relates to an ordinary writing pen, proposes a pen having a balancer disposed within the main body thereof movable in an axial direction thereof. However, such a pen is not useful for preventing rolling.

SUMMARY OF THE INVENTION

It is a main object of the present invention to provide a pen for input operation which does not have a projecting clip, and yet can prevent the rolling thereof.

In accordance with the present invention, there is provided a pen for use in inputting to an electronic apparatus, which comprises: a cylindrical pen body made of a resin; a pen tip attached to one end of the pen body; and a weight member disposed within the pen body as offsetting from the axis of the pen body, said weight member having a density higher than that of the resin to allow the center of gravity of the pen body to be radially eccentric with respect to the axis thereof.

DETAILED DESCRIPTION OF THE PREFERRED EMBODIMENTS

Figure 1:
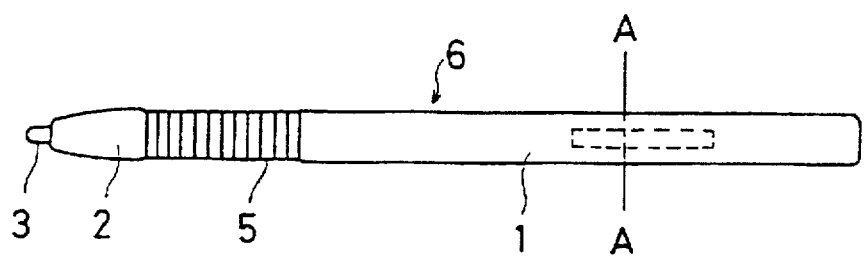
FIG. 1 is a plan view of a pen for input operation in accordance with one embodiment of the present invention.

Exemplary electronic apparatuses applicable to the present invention include electronic diaries, word processors, personal computers and other electronic apparatus which are capable of processing data input by means of a pen-type input device.

A pen of the present invention has a pen body, a pen tip and a weight member disposed within the pen body, offset from the axis thereof. The pen body is made of a thermoplastic resin such as AS resin or ABS resin, and the pen tip is made of the thermoplastic resin or metal.

The density of the aforesaid resin is about 1.0 g/cm$^3$ to 2.0 g/cm$^3$ therefore, the weight member may be made of any material having a density greater than that of the resin, e.g., lead (density: 11.36 g/cm$^3$), copper (8.96 g/cm$^3$), iron (7.87 g/cm$^3$), nickel (8.90 g/cm$^3$), chromium (7.19 g/cm$^3$), or an alloy thereof.

The weight member is preferably of an elongated rod shape and disposed parallel to the axis of the body. However, it should be noted that the shape and mounting position or orientation thereof are not limited thereto.

The electronic apparatus may have a pen accommodating portion for releasably accommodating the pen, which is adapted to accommodate the pen when the pen is not in use.

The pen accommodating portion for releasably accommodating the pen may be a cavity formed in the electronic apparatus for receiving the pen inserted in an axial direction thereof or an elongated recess for receiving the pen inserted in a direction perpendicular to the axis thereof.

The electronic apparatus having the pen accommodating portion may be adapted to detect the presence of the pen which is releasable accommodated in the pen accommodating portion.

In such a case, the electronic apparatus may have a pair of contacts for electrical switching, formed adjacent to the pen accommodating portion, so that the weight member can establish an electrical connection between the pair of contacts when the pen is accommodated in the pen accommodating portion. The electronic apparatus detects the presence of the pen in the pen accommodating portion by detecting whether the electrical connection between the pair of contacts is established or not.

To realize such function, part of the weight member should be made of an electrically conductive material and exposed to the exterior of the pen body. Exemplary electrically conductive materials to be used include copper and brass, and those plated with silver or the like, which have densities much higher than those of resins.

Alternatively, the electronic apparatus may have a switch, such as a reed switch, disposed adjacent to the pen accommodating portion and adapted to be magnetically actuated to detect the presence of the Den in the pen accommodating portion thereof by utilizing the weight member. When the pen is accommodated in the pen accommodating portion, the weight member serves to actuate the switch.

In such a case, the weight member should be made of a permanent magnetic material. Permanent magnetic materials preferable in terms of magnetic force and density include Alnico alloys, ferrite alloys and rare earth metal alloys.

Where the electronic apparatus has the aforesaid pen accommodating portion for releasably accommodating the pen and the aforesaid contacts or switch to realize the function of detecting the presence of the pen in the pen accommodating portion, the electronic apparatus can control the actuation of various functions thereof by detecting the presence of the pen.

More specifically, power supply to electronic circuitry of the electronic apparatus from a power source such as a built-in battery may be stopped when the pen is accommodated in the pen accommodating portion, i.e., the pen is not in use.

In such a case, however, the electronic apparatus should include a power supply controlling circuit for stopping the power supply to the electronic circuitry by detecting the closing of the aforesaid contacts or switch. Thereby, the power waste of the power source (especially, built-in battery) can be prevented.

With reference to the attached drawings, pens for input operation of the present invention will be described in detail, which are used for an electronic apparatus such as electronic diary, handy information tool, word processor, personal computer or the like which has hand-writing and/or touch-key input functions.

Figure 2:
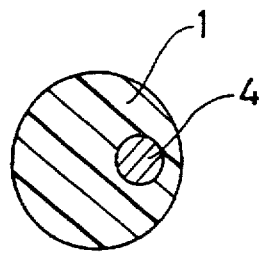
FIG. 2 is a sectional view illustrating a principal portion of the pen for input operation shown in FIG. 1.

FIG. 1 is a plan view of a pen for input operation in accordance with one embodiment of the present invention. FIG. 2 is a sectional view along the line A—A of FIG. 1. As shown, the pen 6 includes a pen body 1 made of a resin, a pen tip 3 made of a resin or metal and press-fitted into a tip portion 2 of the pen body 1, and a pen holder 5. The pen tip 3, which provides a contact to a writing surface for pen-input to the electronic apparatus, has a narrow tip for easy input and a mirror-finished surface for smooth sliding and reduced friction.

Figure 3:
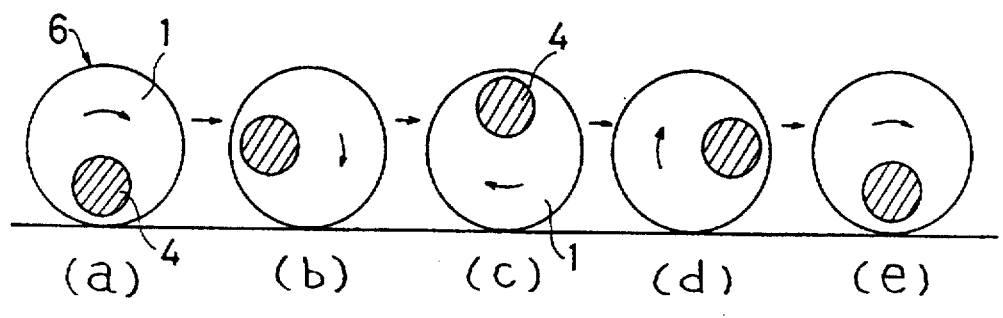
FIG. 3 is a sectional view illustrating a principal portion of the pen for input operation for explaining the rotation thereof.

The pen body V is molded of ABS resin into a given shape through mass production. An elongated metal member 4 having a specific gravity higher than that of the material of the pen body 1 is embedded in the pen body 1, offset from the axis thereof. Accordingly, the center of gravity of the pen 6 is eccentric with respect to the axis of the pen 6. When the pen 6 rolls on a horizontal surface, e.g., on the top face of a desk in the direction shown by arrows in FIG. 3, that is, the pen 6 rolls from a position (a) to a position (e), a force to keep the positions (a) and (e) is exerted to the pen 6, thereby stopping the rotation of the pen 6 before the pen 6 rotates at least several times.

Figure 12:
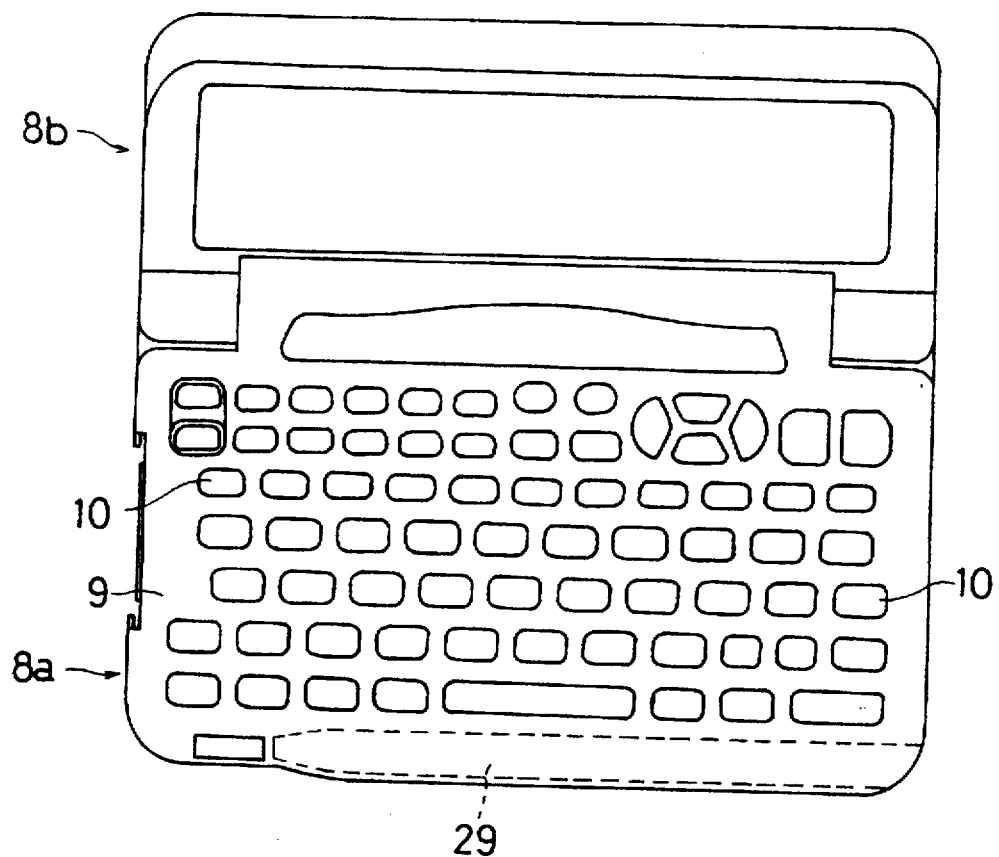
FIG. 12 is a plan view of an electronic apparatus.
Figure 13:
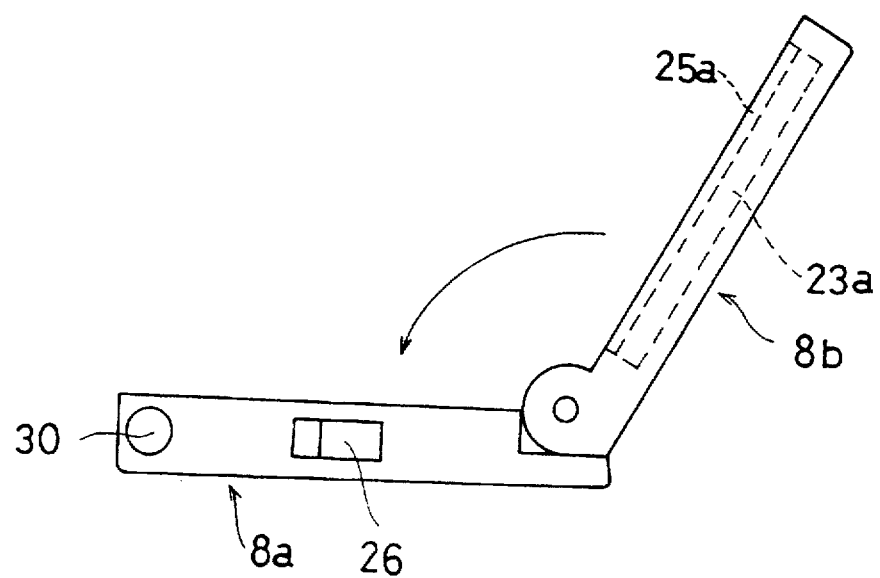
FIG. 13 is a side view of the electronic apparatus.

FIG. 12 is a plan view of an exemplary electronic apparatus capable of accepting data input by means of the pen of the present invention, and FIG. 13 is a side view thereof. As shown, the electronic apparatus has various kinds of keys 10 arranged in the keyboard 9 on the upper face of the main body 8a thereof, a main switch 26 disposed on a side face of the main body 8a, and a display portion 8b having a liquid crystal display (LCD) 23a and a transparent tablet 25a overlaid on the LCD 23a.

After turning on the main switch 26 to actuate the electronic apparatus, a user inputs information into the electronic apparatus by hand-writing on the tablet 25a with the pen 6 or operating the keys in accordance with an instruction displayed on the LCD 23a.

The main body 8a has a pen accommodating portion for accommodating the pen 6, i.e., a cavity 29 having an opening 30 on a side face thereof. When the electronic apparatus is not in use, the pen is accommodated in the cavity 29, and the display portion 8b is closed in the arrow direction shown in FIG. 13 to be overlaid on the main body 8a for compactness and handiness.

Figure 4:
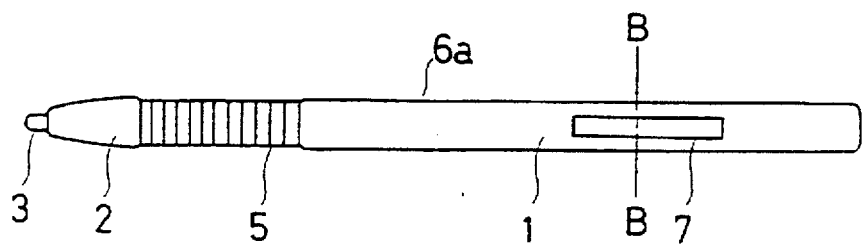
FIG. 4 is a plan view of a pen for input operation in accordance with another embodiment of the present invention.
Figure 5:
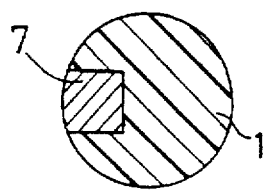
FIG. 5 is a sectional view illustrating a principal portion of the pen for input operation shown in FIG. 4.

FIG. 4 is a plan view of a pen for input operation in accordance with another embodiment of the present invention. FIG. 5 is a sectional view along the line B—B in FIG. 4. Like reference characters designate the like parts shown in FIG. 1. In a pen 6a, an elongated metal member 7 having a specific gravity higher than that of the material of a pen body 1 is embedded in the pen body 1, offset from the axis of the pen body 1, like the pen 6 shown in FIG. 1. In this embodiment, however, the metal member 7 is exposed to the exterior without projecting outwardly from an outer surface of the pen body 1 and with the exposed surface thereof having the same curvature as that of the outer surface of the pen body 1.

Figure 6:
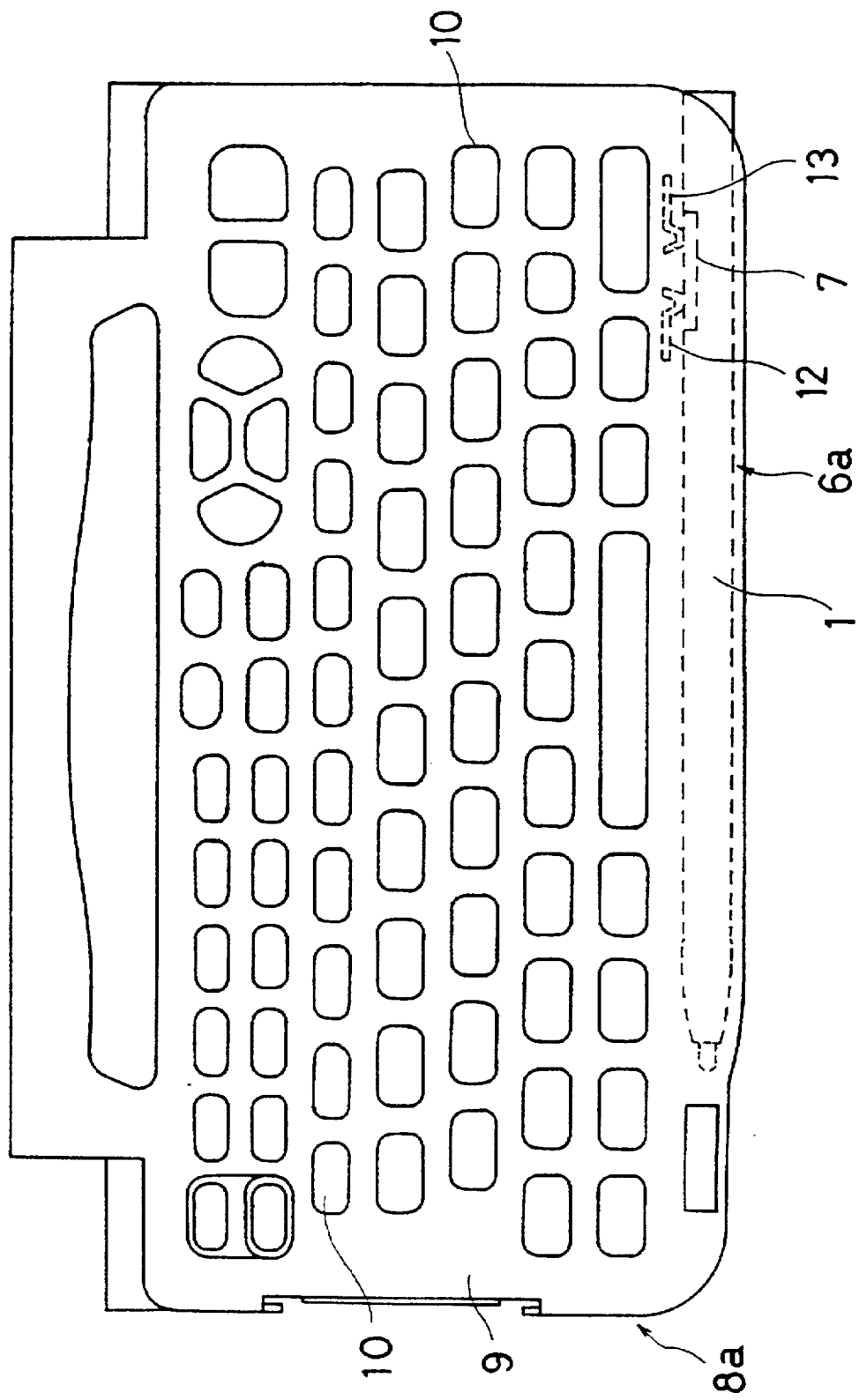
FIG. 6 is a plan view illustrating an electronic apparatus in a state where the pen for input operation shown in FIG. 4 is accommodated therein.

FIG. 6 is a plan view illustrating a main body of an electronic apparatus capable of accepting data input by means of the pen 6a (a display portion thereof is omitted in FIG. 6 for simplicity, and like reference characters designate the like parts shown in FIG. 12). As shown, various kinds of keys 10 are arranged in the keyboard 9. A cavity 29 is formed in the main body 8a for accommodation of the pen 6a. A pair of contacts 12 and 13 for turning ON and OFF a local power supply to electronic circuitry in the electronic apparatus (or for detecting the presence of the pen 6a) are formed on the interior surface of the cavity 29. In a state where the pen 6a is accommodated in the cavity 29, the metal member 7 is in contact with the contacts 12 and 13 to electrically connect the contacts 12 and 13. The ON/OFF operation of the local power supply will be described later.

Figure 7:
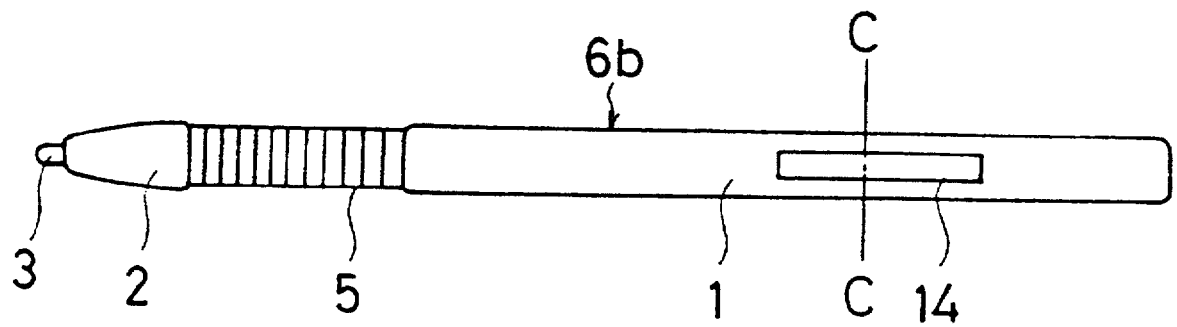
FIG. 7 is a plan view of a pen for input operation in accordance with still another embodiment of the present invention.
Figure 8:
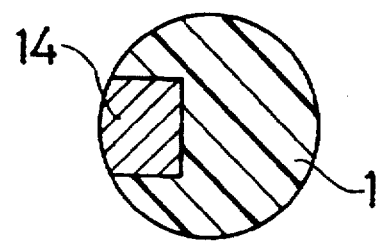
FIG. 8 is a sectional view illustrating a principal portion of the pen for input operation shown in FIG. 7.

FIG. 7 is a plan view of a pen for input operation in accordance with still another embodiment of the present invention. FIG. 8 is a sectional view along the line C—C in FIG. 7. Like reference characters designate the like parts shown in FIG. 1. In a pen 6b, an elongated magnetic member 14 having a specific gravity higher than that of the material of a pen body 1 is embedded in the pen body 1, offset from the axis of the pen body 1, like the pen 6 shown in FIG. 1. In this embodiment, however, the magnetic member 14 is exposed to the exterior without projecting outwardly of an outer surface of the pen body a and with the exposed surface thereof having the same curvature as that of the outer surface of the pen body 1.

Figure 9:
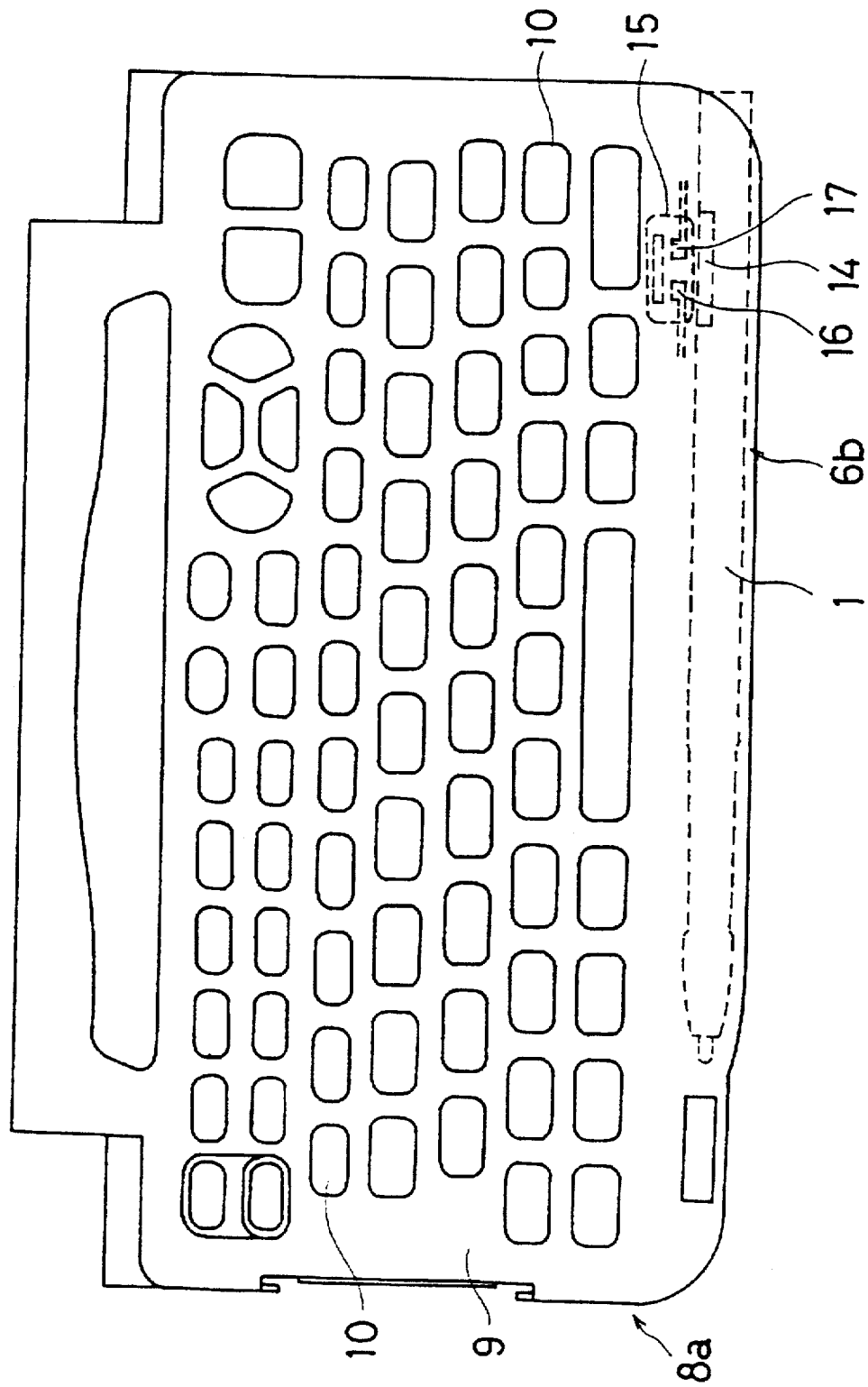
FIG. 9 is a plan view illustrating an electronic apparatus in a state where the pen for input operation shown in FIG. 7 is accommodated therein.

FIG. 9 is a plan view illustrating a main body of an electronic apparatus capable of accepting data input by means of the pen 6b. Like reference characters designate the like parts shown in FIG. 12. As shown, various kinds of keys 10 are arranged in the keyboard 9. A cavity 29 is formed in the main body 8a for accommodation of the pen 6b. A reed switch 15 is provided in position adjacent to the cavity 29 in the main body 8a, so that the reed switch 15 can be actuated by the magnetic member 14 in a state where the pen 6b is accommodated in the cavity 29. Therefore, when the pen 6b is accommodated in the cavity 29, a contact strip of the reed switch 15 is brought into contact with contacts 16 and 17 for turning ON and OFF a local power supply to electronic circuitry in the electronic apparatus (or for detecting the presence of the pen 6b in the cavity 29) to electrically connect the contacts 16 and 17. Where the magnetic member 14 is used in combination with the reed switch 15, the magnetic member 14 is not necessarily required to be exposed to the exterior. The magnetic member 14 may be buried in a position corresponding to the reed switch 15 to suffice for this purpose.

Figure 10:
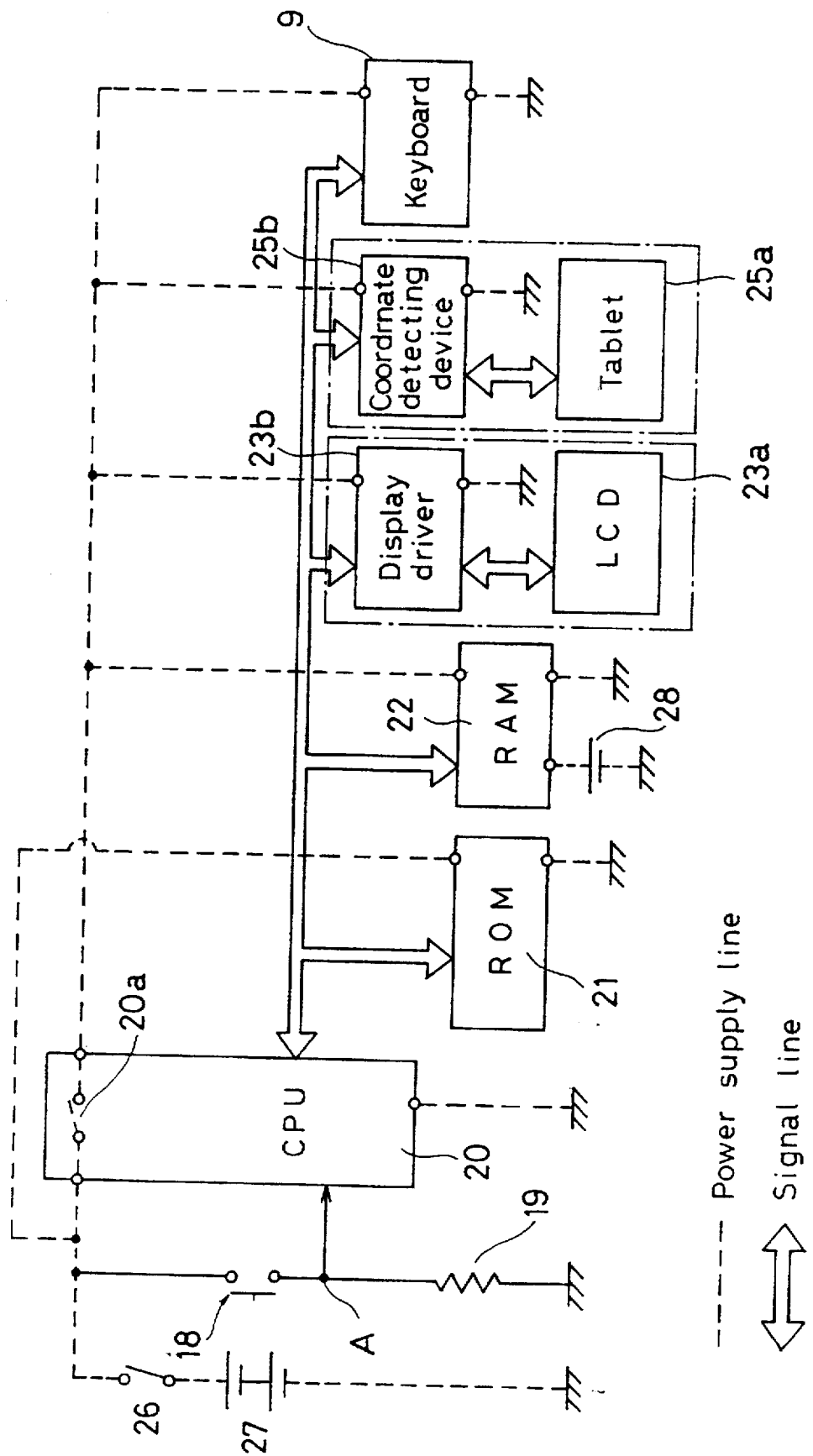
FIG. 10 is a schematic system diagram of an electronic apparatus.

FIG. 10 is a schematic system diagram of an electronic apparatus capable of accepting data input by means of the pen 6a or 6b. In FIG. 10, there are shown a microprocessor having a CPU 20, ROM 21 and RAM 22, a coordinate detecting device 25b for recognizing data input from a tablet 25a by means of the pen 6a or 6b, a display driver 23b for driving an LCD 23a, and a keyboard 9, which are all connected via signal lines. The data input from the tablet 25a or the keyboard 9 are temporarily stored in the RAM 22. The CPU 20 processes the input data in accordance with programs preliminary stored in the ROM 21. The processing result is displayed on the LCD 23a.

A main battery 27 supplies power to the CPU 20 and ROM 21 via a main switch 26 as well as to high power-consumption components including the RAM 22, display driver 23b, coordinate detecting device 25b and keyboard 9 via a subswitch 20a incorporated in the CPU 20. When power is not supplied to the RAM 22 from the main battery 27, an auxiliary battery 28 supplies power to the RAM 22 for backup.

As shown in FIG. 10, an electrical switch 18, which is constituted by the metal member 7 and the contacts 12 and 13 as shown in FIG. 6, is connected to the CPU 20 at one end thereof and is grounded at the other end thereof (at point A) via a resistor 19 having a predetermined resistance.

Of course, the electrical switch 18 may otherwise be constituted by the magnetic member 14 and the reed switch 15.

When the pen 6a or 6b is inserted into the cavity 29 in the main body 8a of the electronic apparatus, the electrical switch 18 shown in FIG. 10 closes with the potential at the point A being "H" level. On the other hand, when the pen 6a or 6b is taken out of the cavity 29, the electrical switch 18 opens with the potential at the point A being "L" level.

Figure 11:
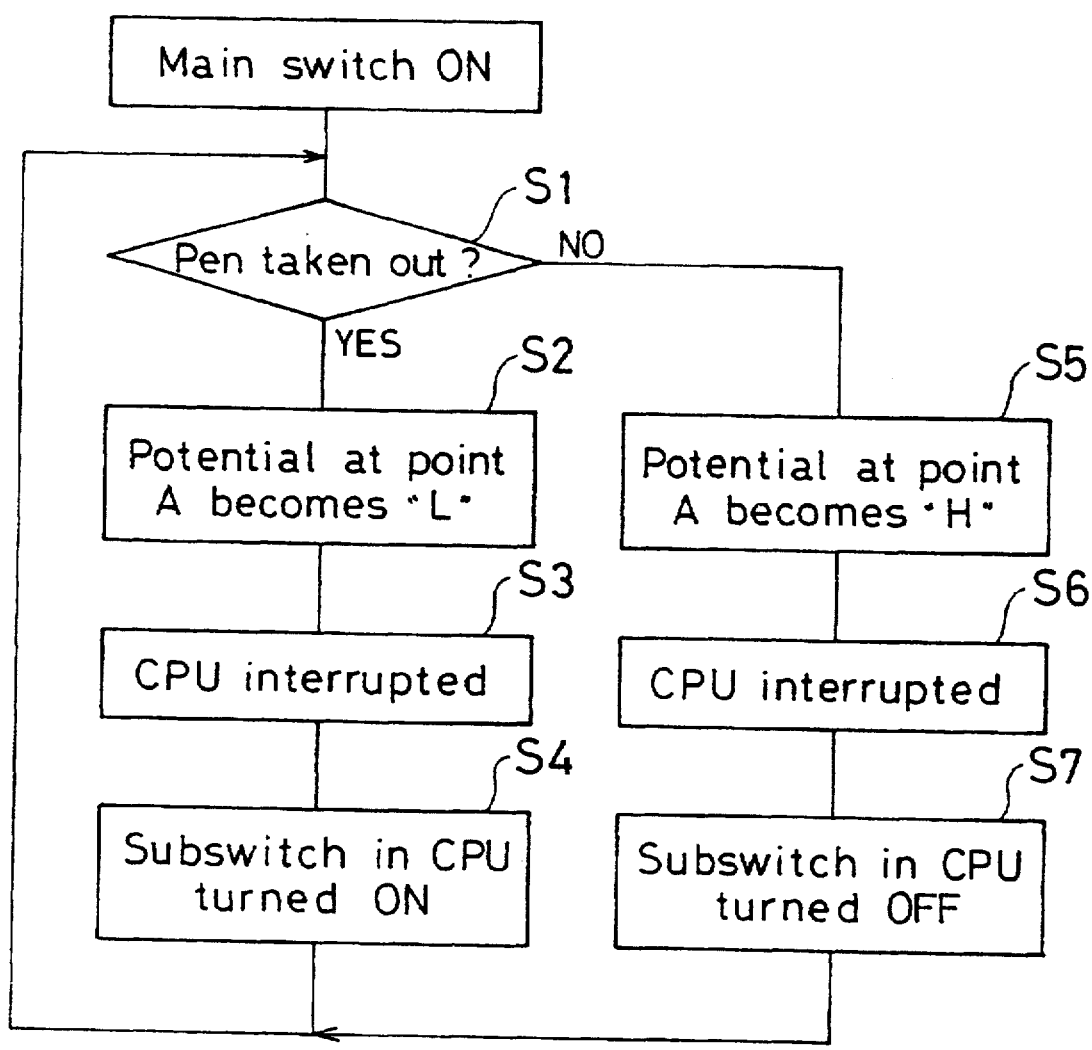
FIG. 11 is a flow chart of an ON/OFF operation for turning ON and OFF a local power supply to the electronic apparatus.

FIG. 11 is a flow chart of an ON/OFF operation of the subswitch 20a incorporated in the CPU 20 for turning ON and OFF a local power supply to the electronic apparatus, i.e., the power supply from the main battery 27 to the RAM 22, display driver 23b, coordinate detecting device 25b and keyboard 9. If the main switch 26 is turned ON and the pen 6a or 6b is inserted in the electronic apparatus, the potential at the point A is "H" level. If the pen 6a or 6b is taken out of the electronic apparatus (if YES in step S1), the potential at the point A becomes "L" level (S2), then the CPU 20 is interrupted (S3), and the subswitch 20a in the CPU 20 is turned ON (S4).

On the other hand, if the pen 6a or 6b is inserted into the electronic apparatus to turn OFF the local power supply to the electronic apparatus (if NO in step S1), the potential at the point A detected by the CPU 20 is "H" level (S5), and the subswitch 20a in the CPU 20 is turned OFF (S6, S7).

Thus, when a user inserts the pen 6a or 6b into the cavity 29 of the main body 8a after using the electronic apparatus, the power supply to the relatively high power-consumption components is stopped and, therefore, power waste from the main battery 27 can be prevented even if the user forgets to turn off the main switch 26.

In accordance with the present invention, since the weight member having a specific gravity higher than that of the material of the pen body is embedded in the pen body in an eccentric relation with respect to the axis of the pen body, the pen can be prevented from rolling.

In addition, since rolling prevention can be achieved without providing a clip projecting outwardly from the pen body, the pen has a shape that comfortably fits into a user's hand, and that occupies only a small space in the electronic apparatus for accommodation.

Further, the pen of the present invention can eliminate a directional disposition which would be caused by the clip projection when a user holds the pen and, hence, partial wearing of the pen tip can be prevented.

Still further, when the pen is accommodated in the electronic apparatus, the power supply to high power-consumption components of the electronic apparatus can be automatically turned OFF. Hence, power waste from the main battery can be prevented even if a user forgets to turn off the main switch. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pen for inputting to an electronic apparatus, comprising:

a cylindrical pen body made of a resin;

a pen tip attached to one end of the pen body; and a weight member, disposed within the pen body offset from an axis of the pen body and having a density higher than that of the resin, for creating a center of gravity of the pen body which is radially eccentric with respect to the axis thereof.

2. A pen as set forth in claim 1, wherein said weight member is of an elongated rod shape and is disposed parallel to the axis of the pen body.

3. A pen as set forth in claim 1, wherein said electronic apparatus includes a pen accommodating portion in which said pen body is releasably accommodated.

4. A pen as set forth in claim 1, wherein said weight member is made of an electrically conductive metal, and part of said weight member is exposed to the ambient without projecting outwardly from an outer surface of said pen body.

5. A pen as set forth in claim 1, wherein said weight member is made of an electrically conductive metal, and part of said weight member is exposed to the ambient without projecting outwardly from an outer surface of said pen body, and wherein said electronic apparatus includes a pen accommodating portion and a pair of contacts for electrical switching, formed adjacent to the pen accommodating portion, whereby the exposed part of said weight member establishes an electrical connection between said pair of contacts when the pen is accommodated in said pen accommodating portion.

6. A pen as set forth in claim 1, wherein said weight member is made of an electrically conductive metal, and part of said weight member is exposed to the ambient without projecting outwardly from an outer surface of said pen body; and said electronic apparatus includes a pen accommodating portion, a pair of contacts for electrical switching formed adjacent to the pen accommodating portion, electronic circuitry for processing data input by means of the pen, power supply controlling circuitry for controlling supply of power to the electronic circuitry from a power source and for controlling stoppage of the supply of power from the power supply to the electronic circuitry when an electrical connection between said pair of contacts for electrical switching is established, whereby the exposed part of said weight member establishes the electrical connection between said pair of contacts to stop the power supply to the electronic circuitry when the pen body is accommodated in the pen accommodating portion.

7. A pen as set forth in claim 6, wherein said power source is a battery incorporated in said electronic apparatus.

8. A pen as set forth in claim 1, wherein said weight member is made of a magnetic material.

9. A pen as set forth in claim 1, wherein said weight member is made of a magnetic material, wherein said electronic apparatus includes a pen accommodating portion and a switch disposed adjacent to the pen accommodating portion and adapted to be magnetically actuated, whereby said weight member actuates the switch when the pen is accommodated in the pen accommodating portion.

10. A pen as set forth in claim 1, wherein said weight member is made of a magnetic material; and
said electronic apparatus includes a pen accommodating portion, a switch disposed adjacent to the pen accommodating portion and adapted to be magnetically actuated, electronic circuitry for processing data input by means of the pen, power supply controlling circuitry for controlling supply of power to the electronic circuitry from a power source and controlling stoppage of the supply of sower from the power supply to the electronic circuitry when said switch is actuated, whereby said weight member actuates said switch to stop the power supply to the electronic circuitry when the pen body is accommodated in the pen accommodating portion.

11. A pen as set forth in claim 10, wherein said power source is a battery incorporated in said electronic apparatus.

12. The pen of claim 1, wherein a density of the resin is at least 1.0 g/cm$^3$ and at most 2.0 g/cm$^3$.

13. The pen of claim 1, wherein a density of the weight member is at least 7.0 g/cm$^3$.

14. A pen as set forth in claim 1, wherein said weight member is imbedded within the resin such that the pen body has a continuous, solid cross-section including said weight member.

15. An electronic apparatus comprising:
a recess for accommodating a stylus, the stylus including a main body section and a member at least partially disposed within the main body section;

electronic circuitry for processing data input by the stylus;

a power supply for supplying power to the electronic circuitry; and switching means for stopping the supply of power from the power supply to the electronic circuitry upon the stylus being accommodated in the recess, wherein the member disposed within the main body section of the stylus is made of a magnetic material and the switching means is adapted to be magnetically actuated.

16. An electronic apparatus comprising:
a recess for accommodating a stylus, the stylus including a main body section and a member at least partially disposed within the main body section;

electronic circuitry for processing data input by the stylus;

a power supply for supplying power to the electronic circuitry; and switching means for stopping the supply of power from the power supply to the electronic circuitry upon the stylus being accommodated in the recess, wherein the switching means includes a pair of contacts formed adjacent to the recess and wherein at least a portion of the member included in the stylus is exposed to the ambient so as to establish an electrical connection between the pair of contacts and stop the supply of power upon the stylus being accommodated in the recess.

* * * * *